US010659692B2

(12) United States Patent
Miyazawa

(10) Patent No.: US 10,659,692 B2
(45) Date of Patent: May 19, 2020

(54) IMAGE BLUR CORRECTION DEVICE, IMAGING APPARATUS, CONTROL METHOD OF IMAGING APPARATUS AND NON-TRANSITORY STORAGE MEDIUM

(71) Applicant: CANON KABUSHIKI KAISHA, Tokyo (JP)

(72) Inventor: Hitoshi Miyazawa, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 57 days.

(21) Appl. No.: 15/937,132

(22) Filed: Mar. 27, 2018

(65) Prior Publication Data

US 2018/0288330 A1 Oct. 4, 2018

(30) Foreign Application Priority Data

Mar. 28, 2017 (JP) ................................ 2017-063597

(51) Int. Cl.
*H04N 5/232* (2006.01)
*H04N 5/235* (2006.01)
*H04N 5/262* (2006.01)

(52) U.S. Cl.
CPC ......... *H04N 5/23267* (2013.01); *H04N 5/235* (2013.01); *H04N 5/2353* (2013.01); *H04N 5/23229* (2013.01); *H04N 5/23254* (2013.01); *H04N 5/23258* (2013.01); *H04N 5/23261* (2013.01); *H04N 5/23287* (2013.01); *H04N 5/2621* (2013.01)

(58) Field of Classification Search
CPC ............. H04N 5/23264; H04N 5/2328; H04N 5/23287; H04N 5/23251; H04N 5/23254; H04N 5/23258; G02B 27/64; G02B 27/646

See application file for complete search history.

(56) References Cited

U.S. PATENT DOCUMENTS

| | | | | |
|---|---|---|---|---|
| 9,332,185 B2* | 5/2016 | Ho | ...................... | H04N 5/23267 |
| 9,781,346 B2* | 10/2017 | Abe | ........................ | G06T 7/246 |
| 10,158,803 B2* | 12/2018 | Miyazawa | ......... | H04N 5/23287 |
| 10,194,085 B2* | 1/2019 | Kameda | .............. | H04N 5/23277 |
| 10,230,897 B2* | 3/2019 | Ikeda | ................. | H04N 5/23254 |
| 2016/0301858 A1* | 10/2016 | Aoyama | ............ | H04N 5/23222 |
| 2018/0067334 A1* | 3/2018 | Gyotoku | ................... | G01P 3/36 |
| 2018/0255245 A1 | 9/2018 | Miyazawa | | |

FOREIGN PATENT DOCUMENTS

JP 2006-317848 A 11/2006

* cited by examiner

*Primary Examiner* — Ngoc Yen T Vu
(74) *Attorney, Agent, or Firm* — Carter, DeLuca & Farrell LLP

(57) ABSTRACT

According to an aspect of the invention, an image blur correction device includes: a memory; and at least one processor operating in accordance with a program stored in the memory. The at least one processor comprises: a detection unit configured to detect motion amounts of images on the basis of imaged images; a calculation unit configured to calculate a motion amount of an object on the basis of the motion amounts of the images detected by the detection unit and a detection signal of blur detected by a blur detection unit; and a control unit configured to control the image blur correction unit on the basis of the motion amount of the object calculated by the calculation unit.

13 Claims, 10 Drawing Sheets

FIG. 7A

| Vector detection setting | Detection frame setting | Largest detection range [pix] | Detection resolution |
|---|---|---|---|
| Detection mode A | Small | Narrow | Fine |
| Detection mode B | Normal | Normal | Normal |
| Detection mode C | Large | Broad | Rough |

FIG. 7B

| Combination of detection setting | Detection mode 1 | Detection mode 2 |
|---|---|---|
| Setting $\alpha$ | Detection mode A | Detection mode B |
| Setting $\beta$ | Detection mode B | Detection mode C |

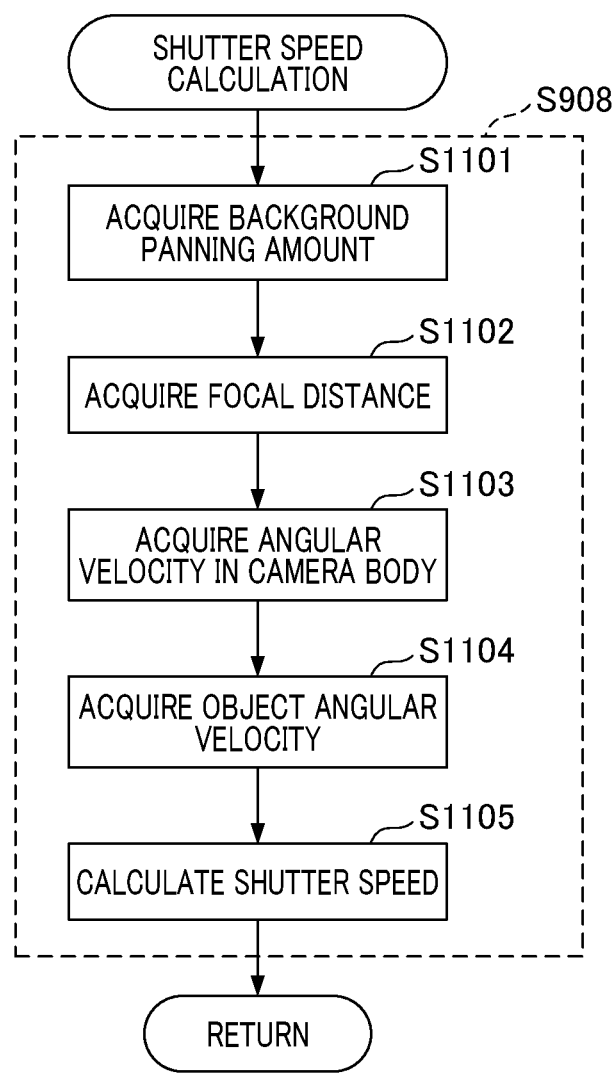

IMAGE BLUR CORRECTION DEVICE, IMAGING APPARATUS, CONTROL METHOD OF IMAGING APPARATUS AND NON-TRANSITORY STORAGE MEDIUM

BACKGROUND OF THE INVENTION

Field of the Invention

The present invention relates to an image blur correction device, an imaging apparatus, a control method of the imaging apparatus, and a non-transitory storage medium.

Description of the Related Art

As one photography method of a camera, there is panning. Panning is a photography scheme of setting a shutter speed to be slow and taking a picture while causing a camera to follow a motion of an object moving in, for example, a horizontal direction to obtain a feeling of lively motion of the object. In panning, when blur occurs between a motion of an object and a motion of a camera, object blur occurs. As a shutter speed is slower, a panning amount in a background increases. Thus, a feeling of lively motion of an object can be obtained. However, image blur or object blur easily occurs.

Accordingly, two photography assist functions are considered to simply realize panning. The first assist function is a function of detecting blur between a motion of an object and a motion of a camera and correcting object blur according to the blur with an optical correction system (hereinafter referred to as a first assist function). The second assist function is a function of automatically setting a shutter speed in a camera (hereinafter referred to as a second assist function). A photography mode that has the two assist functions is called a panning assist mode (hereinafter referred to as panning assist).

Japanese Patent Laid-Open No. 2006-317848 discloses an imaging apparatus that detects a difference between a speed of an object and a blur speed of a camera and corrects image blur equivalent to the difference with regard to the first assist function using an image blur correction function.

The imaging apparatus disclosed in Japanese Patent Laid-Open No. 2006-317848 detects a vector equivalent to an object (hereinafter referred to as an object vector) among vectors detected with a motion vector using the motion vector and an angular velocity and detects a difference between a speed of the object and a blur speed of the camera. The difference between the speed of the object and the blur speed of the camera corresponds to blur between a motion of the detected object and a motion of the camera. Known examples of a method of detecting a motion vector are a block matching method and a correlation method based on a correlation arithmetic operation. In the bock matching method, an input image signal is divided into a plurality of block regions with an appropriate size and a motion vector is detected for each block. First, an image signal is divided into block regions, differences from a previous frame are calculated in units of blocks, and a block of a frame before a sum of absolute values of the calculated differences is the minimum is retrieved. Then, a relative deviation between screens of a certain block of a current frame and the retrieved block of the frame before the sum of the absolute values of the differences is the minimum indicates a motion vector of the block.

However, for example, in vector detection of a pattern with no feature point, such as a pure white wall, a motion vector is erroneously detected in some cases. When a motion vector is erroneously detected, a driving amount of an optical correction system may not be correctly calculated. Therefore, there is a concern of object blur correction being controlled excessively.

SUMMARY OF THE INVENTION

The present invention provides a technology for detecting a motion amount of an object in a screen with high precision in image blur correction in which image blur of the object is corrected.

According to an aspect of the invention, an image blur correction device that corrects blur of an object image by using an image blur correction unit, the object image being imaged by an imaging unit through an imaging optical system, the image blur correction device comprising: a memory; and at least one processor operating in accordance with a program stored in the memory. The at least one processor comprises: a detection unit configured to detect motion amounts of images on the basis of imaged images; a calculation unit configured to calculate a motion amount of an object on the basis of the motion amounts of the images detected by the detection unit and a detection signal of blur detected by a blur detection unit; and a control unit configured to control the image blur correction unit on the basis of the motion amount of the object calculated by the calculation unit. The detection unit detects the motion amounts of the images on the basis of settings, determines a correlation between the motion amounts of the images detected on the basis of the settings, and determines settings to be used to detect the motion amounts of the images on the basis of the correlation.

Further features of the present invention will become apparent from the following description of exemplary embodiments with reference to the attached drawings.

BRIEF DESCRIPTION OF THE DRAWINGS

FIGS. 7A and 7B are explanatory diagrams illustrating detection setting of the motion vector detection unit.

FIG. 11 is a flowchart illustrating a second assist function of the panning assist.

DESCRIPTION OF THE EMBODIMENTS

Figure 1:
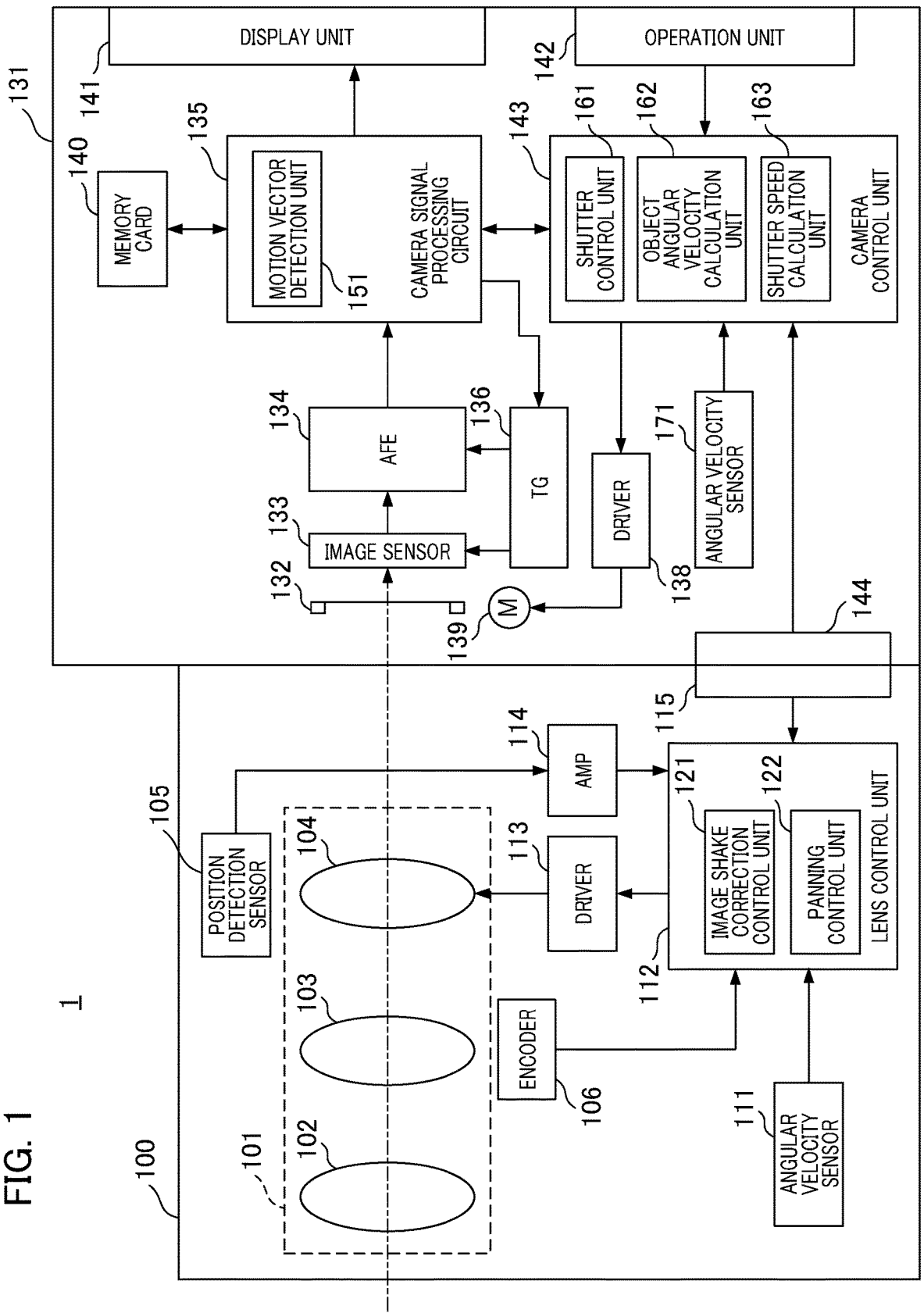
FIG. 1 is a diagram illustrating a configuration of an imaging apparatus.

FIG. 1 is a diagram illustrating a configuration of an imaging apparatus 1 according to an embodiment. A digital camera that has a panning assist function of supporting panning will be described as an example of an imaging system in which an interchangeable lens 100 can be mounted on a camera body 131. A control mode when panning assist is set is referred to as a "panning assist mode."

The interchangeable lens 100 includes a photographic lens unit 101. The photographic lens unit 101 includes a main photographic optical system 102, a zoom lens group 103 capable of changing a focal distance, and a shift lens group 104 for image blur correction. The shift lens group (hereinafter also simply referred to as a shift lens) 104 has a role of a correction lens that corrects image blur by changing a position at which light from an object is formed as an image. By moving the shift lens 104 in a direction perpendicular to an optical axis of the photographic lens unit 101, it is possible to optically correct blur of an image with respect to the optical axis in accordance with blur of the imaging apparatus 1.

The interchangeable lens 100 further includes a zoom encoder 106, a position detection sensor 105, and an angular velocity sensor 111. The zoom encoder 106 detects the position of the zoom lens group 103. The position detection sensor 105 detects the position of the shift lens group 104. The angular velocity sensor 111 is a gyro sensor or the like which is an example of a blur detection unit that detects blur of the imaging apparatus 1 and outputs a blur detection signal.

The interchangeable lens 100 further includes a lens control unit 112, a driver 113, and an amplifier 114. The lens control unit 112 includes a microcomputer for lens system control. The lens control unit 112 performs driving control on the shift lens group 104 through the driver 113. The amplifier 114 amplifies an output of the position detection sensor 105 of the shift lens group 104 and outputs a position detection signal to the lens control unit 112.

The interchangeable lens 100 further includes a mount contact unit 115 and is connected to amount contact unit 144 of the camera body 131. The lens control unit 112 includes first and second control units. The first control unit is an image blur correction control unit 121 that performs image blur correction control. The second control unit is a panning control unit 122 that performs control for panning assist. The lens control unit 112 additionally performs focus adjustment control, aperture control, or the like by moving a focus lens, which will be omitted to simplify the drawings. In the image blur correction by the image blur correction control unit 121, for example, blur is detected and corrected with regard to two orthogonal axes, for example, the horizontal direction and the vertical direction. Since a configuration is the same with regard to the two axes, only one axis will be described. In this way, the imaging apparatus 1 according to the embodiment includes an image blur correction device that corrects image blur by moving the optical element (the shift lens) in a direction orthogonal to the optical axis. An image blur correction method may be a method of moving an image sensor 133 to be described below as a correction element in the direction orthogonal to the optical axis rather than the method of moving the shift lens 104 serving as a correction element in the direction orthogonal to the optical axis. The same also applies to the first assist function.

The camera body 131 includes a shutter 132 controlling an exposure time, the image sensor 133, an analog signal processing circuit (AFE) 134, and a camera signal processing circuit 135. The image sensor 133 is, for example, a complementary metal oxide semiconductor (CMOS) type image sensor, and receives light from an object formed as an image through an imaging optical system and outputs an electric signal through photoelectric conversion. The analog signal processing circuit (AFE) 134 processes the signal output by the image sensor 133 and supplies the processed signal to the camera signal processing circuit 135.

The camera signal processing circuit 135 includes the motion vector detection unit 151. The motion vector detection unit 151 detects a motion of an object based on the signal output by the image sensor 133. The camera signal processing circuit 135 processes the signal output by the image sensor 133, outputs a signal for recording to a memory card 140, and outputs a signal for display to a display unit 141.

The memory card 140 is a recording medium that records a signal of an imaged video and can be detachably mounted on the camera body 131. The display unit 141 includes a display device such as a liquid crystal panel (LCD). The display unit 141 performs monitor display of an image which a user intends to image with the camera and displays the imaged image on a screen. The display unit 141 may be included in the camera body 131 or may be an external device that displays an output from the camera signal processing circuit 135.

The camera body 131 further includes a timing generator (TG) 136 and an operation unit 142. The TG 136 sets an operation timing of the image sensor 133 or the analog signal processing circuit 134. The operation unit 142 includes a power switch, a release switch, and a selector switch. The user can operate the selector switch so that the panning assist mode can be set.

The camera body 131 further includes a camera control unit 143, a driver 138, a shutter driving motor 139, and a shutter 132. The camera control unit 143 includes a microcomputer for camera system control and controls each constituent unit of the imaging system. The camera control unit 143 includes a shutter control unit 161, an object angular velocity calculation unit 162, and a shutter speed calculation unit 163. The shutter control unit 161 controls the shutter driving motor 139 through the driver 138 to control an operation of the shutter 132. The object angular velocity calculation unit 162 calculates an angular velocity of a main object. The shutter speed calculation unit 163 calculates a shutter speed when the panning assist mode is set.

The camera body 131 further includes the mount contact unit 144 with the interchangeable lens 100 and an angular velocity sensor 171. The lens control unit 112 and the camera control unit 143 perform serial communication via the mount contact units 115 and 144 at a predetermined timing. The angular velocity sensor 171 detects blur of the camera body 131 and outputs a blur detection signal to the camera control unit 143.

When the user operates the power switch of the operation unit 142 to turn power of the camera on in the imaging system in FIG. 1, the camera control unit 143 detects a state change. The camera control unit 143 performs power supply and initial setting on each circuit of the camera body 131. Power is supplied to the interchangeable lens 100 and the lens control unit 112 performs initial setting inside the interchangeable lens 100. After the camera control unit 143 and the lens control unit 112 enter a communicable state, communication starts between the camera control unit 143 and the lens control unit 112 at a predetermined timing. In communication from the lens control unit 112 to the camera control unit 143, a camera state, photography setting information, and the like are transmitted. In communication from the camera control unit 143 to the lens control unit 112, focal distance information, angular velocity information, and the like of the interchangeable lens 100 are transmitted.

The user can change a normal mode and the panning assist mode by operating the selector switch of the operation unit 142. The normal mode refers to a mode in which the panning assist mode is not set. When the normal mode is selected, the angular velocity sensor 111 in the interchangeable lens 100 detects blur applied to the camera due to hand blur or the like. The image blur correction control unit 121 performs driving control of the shift lens group 104 using a signal detected by the angular velocity sensor 111. Thus, an image blur correction operation is performed to reduce image blur of the imaged image.

Figure 2:
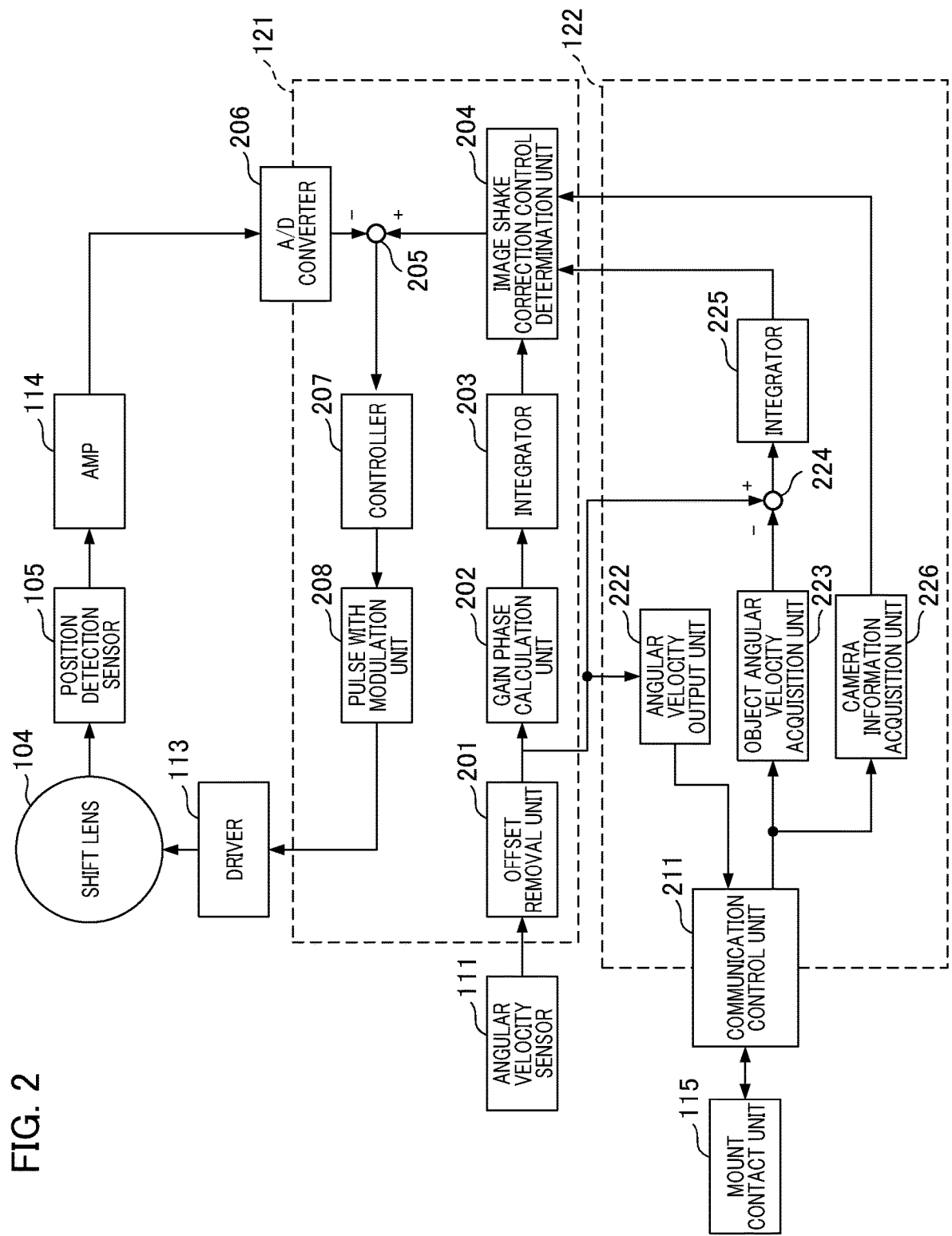
FIG. 2 is a control block diagram illustrating an optical correction system.

An image blur correction function will be described with reference to FIG. 2. FIG. 2 is a diagram illustrating a configuration related to the image blur correction and the panning assist operation. Configurations common to FIG. 1 will be given the reference numerals used therein and the detailed description thereof will be omitted.

The image blur correction control unit 121 includes an offset removal unit 201, a gain phase calculation unit 202, an integrator 203, an image blur correction control determination unit 204, a subtractor 205, an A/D converter 206, a controller 207, and a pulse width modulation unit 208. The offset removal unit 201 removes an offset included in an angular velocity detection signal by the angular velocity sensor 111. The offset removal unit 201 removes a direct-current component included in an output from the angular velocity sensor 111 by a filter arithmetic operation unit including, for example, a highpass filter (HPF).

The gain phase calculation unit 202 acquires an output from the offset removal unit 201 and performs amplification and phase compensation. The gain phase calculation unit 202 includes a phase compensation filter and an amplifier performing amplification with a predetermined gain on the angular velocity signal from which the offset component is removed. The integrator 203 integrates an output from the gain phase calculation unit 202. The integrator 203 has a function by which it can change characteristics with any frequency bandwidth, and calculates a driving amount of the shift lens group 104.

The image blur correction control unit 121 performs a determination process of panning (or tilting) of the imaging apparatus 1. For example, when an angular velocity indicated by a detection signal of the angular velocity sensor 111 has a magnitude equal to or larger than a predetermined threshold and a predetermined time (a threshold time for determination) has elapsed, it is determined that a panning operation is being performed. In this case, a process of gradually changing a cutoff frequency of the HPF inside the offset removal unit 201 on a high-frequency side is performed. Control is performed such that the shift lens returns to an optical central position by gradually changing the cutoff frequency to the high-frequency side and gradually decreasing a target signal of the image blur correction control. When this control is not performed, the phase blur correction is performed with the angular velocity detection signal of much blur of the degree to which a panning operation is determined. As a result, there is a possibility of a change in an angle of view that is unnatural for a photographer being seen on a screen when the shift lens reaches a correction limit point (a limit position of a control range). By performing a process of gradually changing the cutoff frequency of the HPF on the high-frequency side, it is possible to prevent such a phenomenon from occurring.

The image blur correction control determination unit (hereinafter also referred to as a control determination unit) 204 acquires outputs of the integrator 203 and an integrator 255 to be described below and switches signals for driving the shift lens according to an output from the camera information acquisition unit 226. When a photography mode is set to the panning assist mode, the control determination unit 204 selects an output from the integrator 225 calculated by the panning control unit 122. When the photography mode is set to a mode other than the panning assist mode, the control determination unit 204 selects an output from the integrator 203 calculated by the image blur correction control unit 121. The integrator 225 and the camera information acquisition unit 226 will be described later.

The position detection sensor 105 detects a position of the shift lens group 104 and the amplifier 114 amplifies the detection signal. The analog/digital (A/D) converter 206 digitizes the detection signal amplified by the amplifier 114 and outputs the digitized signal to the subtractor 205. The subtractor 205 sets the output from the control determination unit 204 to a positive input, subtracts an output from the A/D converter 206 as a negative input, and outputs deflection data which is a subtraction result to the controller 207.

The controller 207 includes a phase compensation filter and an amplifier amplifying the deflection data output from the subtractor 205 to a predetermined gain. After the phase compensation filter and the amplifier in the controller 207 perform signal processing on the deflection data, the processed deflection data is output to the pulse width modulation unit 208. The pulse width modulation unit 208 acquires output data from the controller 207, modulates the data into a waveform (that is, a PWM waveform) in which a duty ratio of a pulse wave is changed, and outputs the data to the driver 113 for shift lens driving. A voice coil type motor is used in the driving of the shift lens group 104 and the driver 113 moves the shift lens group 104 in a direction perpendicular to the optical axis of the imaging optical system according to the output from the pulse width modulation unit 208.

Next, the first assist function related to the panning assist will be described. The first assist function is a function of detecting blur of a motion of an object and a motion of the camera and correcting object blur according to the blur with an optical correction system.

When the user performs an operation of setting the photography mode to the panning assist mode using the operation unit 142, the camera control unit 143 switches the control to control of panning assist. Information indicating the switching is transmitted from the camera control unit 143 to the lens control unit 112, and the lens control unit 112 switches the control to the control of the panning assist mode. The panning control unit 122 will be described with reference to FIGS. 1 and 2. The panning control unit 122 includes a communication control unit 211, an angular velocity output unit 222, an object angular velocity acquisition unit 223, a subtractor 224, an integrator 225, and a camera information acquisition unit 226.

The camera information acquisition unit 226 (see FIG. 2) acquires various kinds of camera information transmitted from the camera control unit 143 via the communication control unit 211. The camera information is release information or setting information of the panning assist mode. The camera information acquisition unit 226 outputs information necessary for a predetermined process to the control determination unit 204. The angular velocity output unit 222 acquires an output from the offset removal unit 201, that is, an angular velocity detection signal of the angular velocity sensor 111 from which the offset component is removed. The angular velocity output unit 222 transmits the angular velocity detection signal to the camera control unit 143 via the communication control unit 211 and the mount contact unit 115.

The object angular velocity acquisition unit 223 acquires data of an angular velocity of the object calculated by the object angular velocity calculation unit 162 in the camera body 131 via the mount contact unit 144 and the communication control unit 211. The subtractor 224 sets the output from the offset removal unit 201 to a positive input and subtracts the output from the object angular velocity acquisition unit 223 as a negative input. The deflection is calculated by subtracting an angular velocity indicated by the detection signal from which the offset component is removed from the angular velocity of the object by the object angular velocity acquisition unit 223. The subtractor 224 outputs the deflection to the integrator 225. The integrator 225 integrates the deflection and outputs a result of the integration arithmetic operation to the control determination unit 204.

In a process of calculating the angular velocity of the object in the object angular velocity calculation unit 162, a process of detecting a motion amount of an image with vectors and accurately detecting a vector (an object vector) corresponding to the object from all the detected vectors is performed. Then, a process of converting the detected object vector to an angular velocity (object angular velocity) is performed.

Here, a method of accurately detecting the object vector will be described.

In the camera body 131, the motion vector detection unit 151 in the camera signal processing circuit 135 detects a motion vector during the panning assist. That is, the motion vector of the image is detected from a plurality of kinds of video information subjected to the signal processing by the analog signal processing circuit 134.

Figure 3:
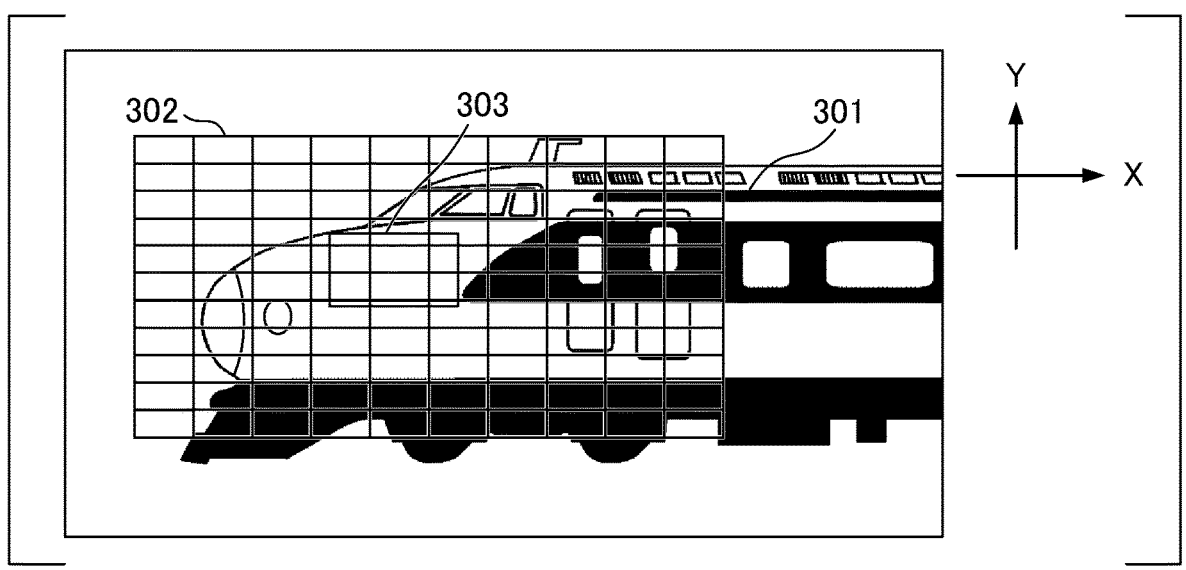
FIG. 3 is an explanatory diagram illustrating vector detection at the time of panning photography.

A specific example of the motion vector detection will be described with reference to FIG. 3. FIG. 3 illustrates an example of a photographic scene of an object 301 which is a moving object. The horizontal direction of a photographic screen is defined as the X direction and the vertical direction of the photographic screen is defined as the Y direction. In this case, two types of vectors detected by the motion vector detection unit 151 are a vector corresponding to a portion of the object 301 and a vector corresponding to a background portion. A rectangular frame equivalent to a plurality of detection blocks is a detection frame 302 for detecting the motion vector. In setting of FIG. 3, a dense type disposition is set for the optical correction system to correct only the deflection of the object in the panning. That is, by setting the dense type disposition, it is possible to improve detection precision of each detection block corresponding to the detection frame 302. A focus frame (focus detection frame) 303 for focusing on the object is indicated by a rectangular frame.

Figure 4A:
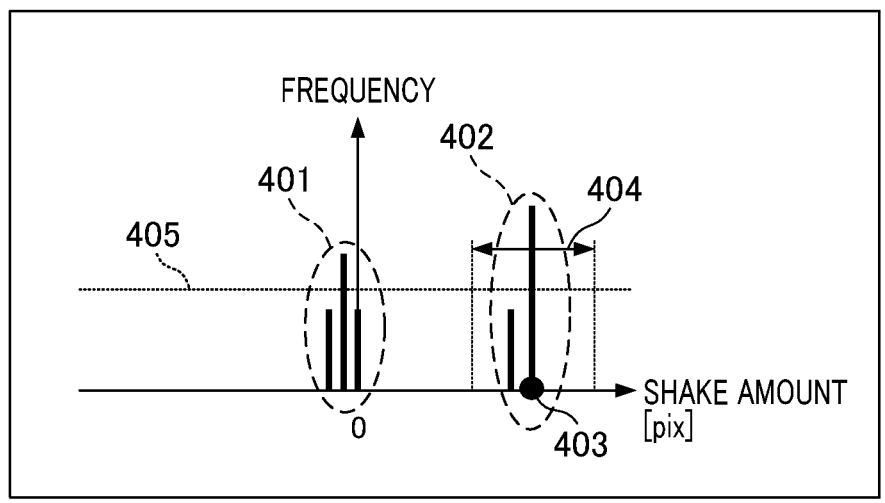
FIGS. 4A and 4B are explanatory diagrams illustrating object vector detection.
Figure 4B:
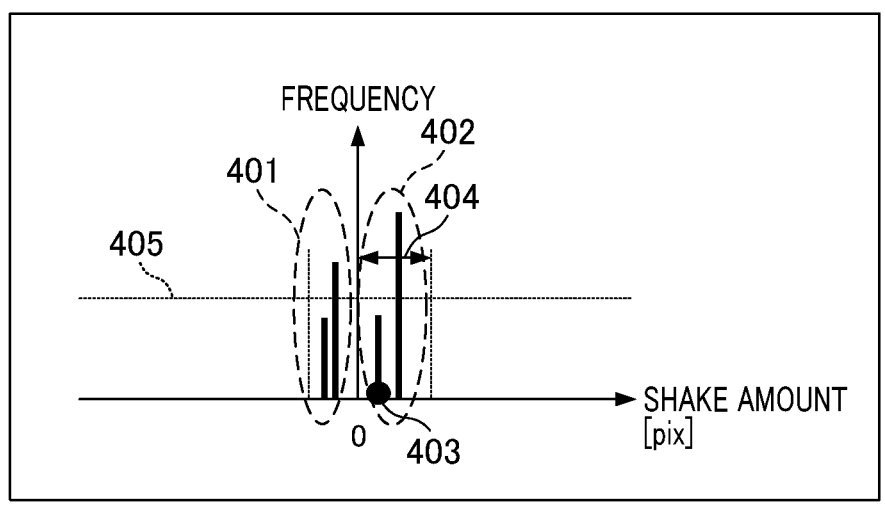

FIG. 4 exemplifies a result when the vectors detected by the motion vector detection unit 151 are calculated as a histogram (a frequency distribution). The horizontal axis represents a blur amount (unit: pixels) and is equivalent to the motion vector. The vertical axis represents a frequency of the motion vector FIG. 4A illustrates a histogram in the X direction (the horizontal direction of the screen) of FIG. 3. FIG. 4B illustrates a histogram in the Y direction (the vertical direction of the screen) of FIG. 3.

First, an operation in the X direction will be described with reference to FIG. 4A. In photography of the object 301 in FIG. 3, a blur amount between a motion of the object and a motion of the camera is small when the camera adequately follows the motion of the object 301. In this case, a vector group 401 equivalent to a portion of the object 301 is located near 0 pix. Conversely, the blur amount between a motion of the object and a motion of the camera increases when the camera does not adequately follow the motion of the object 301. As a result, the vector group 401 equivalent to the portion of the object 301 becomes farther from the position of 0 pix.

The motion vector detection unit 151 does not determine whether a detected vector is a vector corresponding to a main object (hereinafter referred to as a main object vector) or the vector is a vector corresponding to a background (hereinafter referred to as a background vector). That is, in this stage, the vector group 401 corresponding to the object 301 is not distinguished from a vector group 402 corresponding to the background. Accordingly, a process of determining an object vector and a background vector is performed using the fact that a magnitude of the background vector is equal to a blur amount (image surface movement amount) on an imaging surface. Specifically, an image surface movement amount 403 is calculated from an angular velocity of the angular velocity sensor 111 in the interchangeable lens 100. Then, a vector which is in a range determined in advance (hereinafter referred to as a background determination threshold) 404 is determined as a background vector using the image surface movement amount 403 as a reference. A threshold 405 for object determination is set on a frequency axis. A vector which is a vector out of the range of the background determination threshold 404 and is a vector exceeding the threshold 405 is determined as an object vector.

A main object vector which is a vector used for final control is calculated with a value obtained by integrating vectors around a position of a vector closest to the focus frame 303 (see FIG. 3) of the camera in a concentric circular shape using the position of the closest vector as an origin in the vector group 401 determined as the object vectors. In the integration, a given number (for example, 4) of vectors are integrated in the concentric circular shape. The object vector closest to the focus frame 303 is used as the origin because the photographer matches the focus frame 303 with the main object which is a photographic target.

Figure 5:
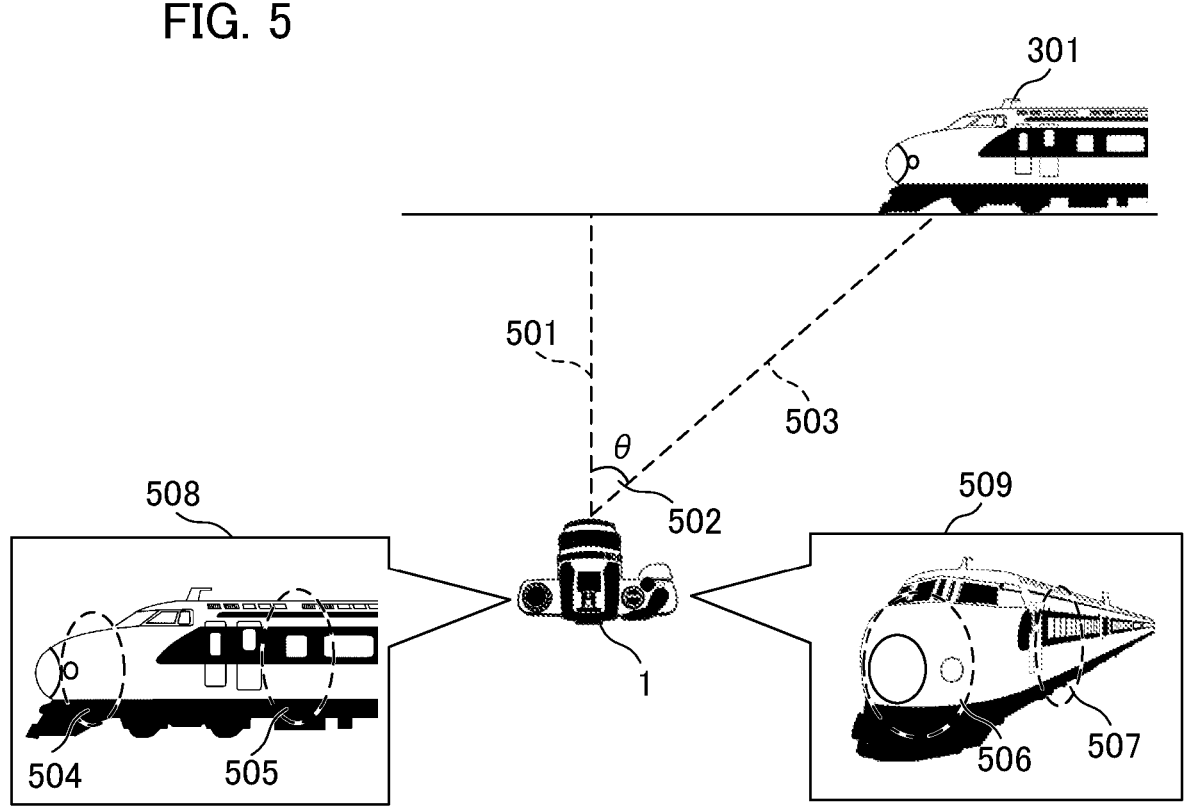
FIG. 5 is an explanatory diagram illustrating an angular velocity of the object at the time of panning photography.

The reason why only some of the vector group 401 is integrated and all of the vector group 401 is not integrated will be described with reference to FIG. 5. FIG. 5 is an explanatory diagram illustrating an angular velocity of the object at the time of panning photography. An angle difference 502 indicates an angle formed by a straight line connecting a position (front) facing the imaging apparatus 1 to the imaging apparatus 1 and a straight line connecting the imaging apparatus 1 to the object 301.

When the object 301 is imaged from a photography distance 501 at the front of the imaging apparatus 1, the angle difference 502 between the object 301 and the imaging apparatus 1 is 0 degrees. At this time, a composition of the object 301 imaged by the imaging apparatus 1 is a composition 508. In the composition 508, there is no angle difference 502 between the object 301 and the imaging apparatus 1 and the object is shown directly horizontally. Therefore, angular velocities at a front position 504 and a rear position 505 of the object 301 are equal to each other. On the other hand, when the object 301 is imaged from a photography distance 503, the angle difference 502 between the object 301 and the imaging apparatus 1 is θ degrees. At this time, a composition of the object 301 imaged by the imaging apparatus 1 is a composition 509. In the composition 509, angular velocities at the front position 506 and the rear position 507 of the object 301 are different from each other according to the angular velocity 502 between the object 301 and the imaging apparatus 1. That is, when there is the angle difference 502 between the object 301 and the imaging apparatus 1, an angular velocity is changed depending on the position of the object 301 although the object 301 is moving at a constant speed. For this reason, when the object 301 is imaged in the composition 509 with the angle difference 502 and all of the detected vector group 401 is integrated, a main object vector stopped near the rear position 507 may be calculated rather than the front position 506 desired to be stopped in the panning, that is, desired to become a main object.

The description will now refer back to FIGS. 4A and 4B. The object vector calculated by the integration is equivalent to the image surface movement amount of the main subject. An angular velocity (an object deflection amount to be corrected) of the main object is obtained by converting an image surface movement amount of the main object into an angular velocity. For the angular velocity used at the time of calculation of the image surface movement amount, an angular velocity detected by the angular velocity sensor 171 in the camera body 131 may be used instead of the angular velocity sensor 111.

Next, an operation of the camera in the Y direction will be described with reference to FIG. 4B. In a photographic scene of FIG. 3, the photographer is assumed to perform an operation of moving the camera in the X direction. In this case an angular velocity in the Y direction is a minute value (for example, 1 deg/sec or less). That is, since the image surface movement amount 403 in the Y direction is located near 0 pix, a minute object vector in the Y direction is included in a range of the background determination threshold 404. For this reason, there is a possibility of the vector group 401 corresponding to the object being erroneously detected as a candidate for the background vector. Accordingly, the object vector in the Y direction is correctly detected by changing the background determination threshold 404 according to the angular velocity and setting the change to be smaller than the background determination threshold 404 in the X direction.

Figure 6:
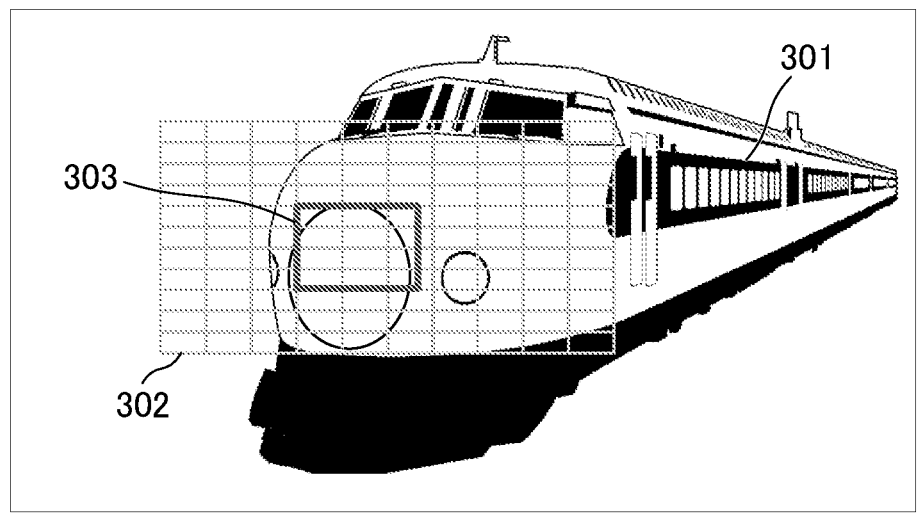
FIG. 6 is an explanatory diagram illustrating a scence which is difficult to deal with in a motion vector detection unit.

FIG. 6 is an explanatory diagram illustrating a scence which is difficult to deal with in the motion vector detection unit 151. The motion vector detection unit 151 may not correctly detect vectors in some cases, for example, there is no feature point in an image of a pure white wall or the like. FIG. 6 illustrates a case in which the photographer attempts to stop a front of the object 301 in a composition in which the angle difference 502 between the object 301 and the imaging apparatus 1 is, for example, +30 degrees. The motion vector detection unit 151 disposes the detection frame 302 for detecting vectors so that the detection frame 302 surrounds the focus frame 303 for focusing on the object. Since the front position of the object 301 on which the detection frame 302 is disposed is pure white without a pattern and there is no portion ascertained as a feature at the time of detection of a vector, there is a concern of the motion vector detection unit 151 erroneously detecting a vector. Accordingly, in the embodiment, the motion vector detection unit 151 detects a motion vector of an image while dynamically changing the setting of the detection frame 302 of the vector. Then, the motion vector at a desired position is calculated by determining a correlation with the detection setting of the motion vector detection unit 151 and determining at which detection setting the vector to be finally adopted for control is detected.

FIGS. 7A and 7B are explanatory diagrams illustrating setting of the detection frame 302 of the vectors by the motion vector detection unit 151. FIG. 7A illustrates setting of each detection mode and FIG. 7B illustrates combined setting detection modes. The motion vector detection unit 151 has three types of vector detection, detection modes A to C.

As illustrated in FIG. 7A, the size of a detection frame in the detection mode A is set to be the smallest among all the detection modes. The largest detection range of the detection frame in the detection mode A is narrower than in the other detection modes, but a detection resolution is fine. In the detection mode B, "normal" is set in the size of the detection frame, the largest detection range, and the detection resolution. Specifically, the size of the detection frame in the detection mode B is set to be larger than the size of the detection frame in the detection mode A and smaller than the size of the detection frame of the detection mode C. Therefore, the largest detection range in the detection mode B is broader than the largest detection range in the detection mode A and is narrower than the largest detection range in the detection mode C. The detection resolution in the detection mode B is rougher than the detection resolution in the detection mode A and finer than the detection resolution in the detection mode C. The size of the detection frame in the detection mode C is set to be larger than the size of the detection frame in the detection mode B. The largest detection range in the detection mode C is broader than the largest detection range in the detection mode B and the detection resolution is rougher than the detection resolution in the detection mode B.

As illustrated in FIG. 7B, the motion vector detection unit 151 has two types of vector detection of settings, a setting α and a setting β. The setting α is a setting in which the detection modes A and B are combined. The setting β is a setting in which the detection modes B and C are combined. The detection modes of the motion vector detection unit 151 are not limited to the three types of detection modes and a plurality of other detection modes in which detection frame setting is different may be used. The setting of the vector detection of the motion vector detection unit 151 is not limited to the two types of settings. For example, as long as a setting corresponds to a combination of the detection modes, such as a setting in which the detection modes A and C are combined, the setting may be included.

Figure 8A:
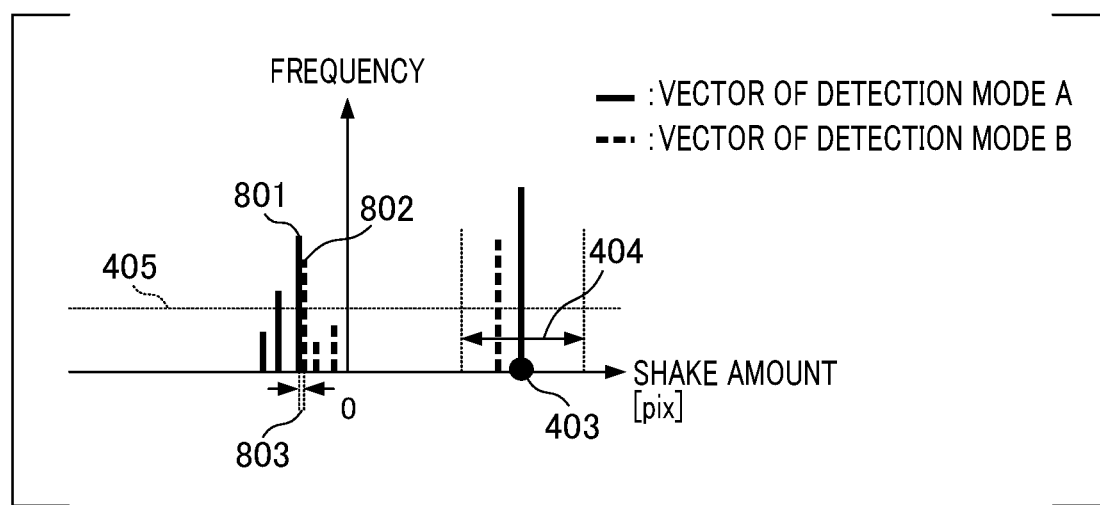
FIGS. 8A and 8B are explanatory diagrams illustrating a correlation in the detection setting of the motion vector detection unit.
Figure 8B:
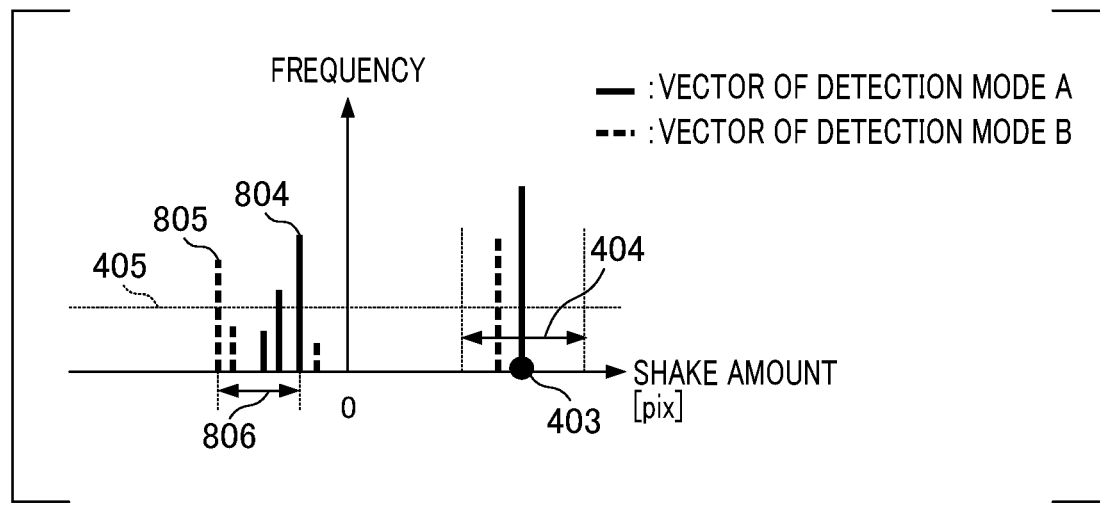

In the assist mode in normal panning, vector detection is performed with a setting α in which the detection modes A and B are combined. A correlation between the detection modes A and B will be described with reference to FIGS. 8A and 8B. FIGS. 8A and 8B are explanatory diagrams illustrating the correlation in the detection setting. The horizontal axis represents a blur amount (unit: pixels) and is equivalent to a motion vector. The vertical axis presents a frequency of the motion vector.

FIG. 8A illustrates a case in which there is a correlation in detection of the detection modes A and B in histograms of vectors detected in the detection modes A and B. In determination of the correlation, a difference in a deflection amount between a vector with a frequency peak on the histogram among vectors determined as the object in the detection mode A and a vector with a frequency peak on the histogram among vectors determined as the object in the detection mode B is compared with a threshold. When the difference is equal to or smaller than the correlation determination threshold, it is determined that there is the correlation. For example, the correlation determination threshold may be set to 2 pix in combination of the detection modes A and B and may be changed according to a combination pattern of the detection modes.

In FIG. 8A, it is determined that there is the correlation since a difference 803 between a vector 801 determined as the object in the detection mode A and a vector 802 determined as the object in the detection mode B is equal to or smaller than the correlation determination threshold. When it is determined that there is the correlation, the detection mode in which the detection frame setting is small among the detection modes is adopted as a detection mode to be used for the control. Accordingly, in FIG. 8A, a detection value of the motion vector detected in the detection mode A is used for the control.

Conversely, FIG. 8B illustrates a case in which there is no correlation in the detection of the detection modes A and B in the histograms of vectors detected in the detection modes A and B. In FIG. 8B, it is determined that there is no correlation since a difference 806 in a deflection amount between a vector 804 determined as the object in the detection mode A and a vector 805 determined as the object in the detection mode B is larger than the correlation determination threshold. When it is determined that there is no correlation, the detection mode in which vector detection reliability is high is used for the control. The vector detection reliability detected by the motion vector detection unit 151 is a value that is simultaneously output with a vector detection value. For example, when there is no feature point in image information or contrast of image information is low with low luminance, the detection reliability is assumed to have a low value. That is, it is determined that a vector acquired in a case in which it is difficult for the motion vector detection unit 151 to detect image information as a target has low detection reliability. A detection mode in which detection reliability is output in each detection block, reliability of the whole detection frame 302 is calculated from the detection reliability of each detection block, and the whole reliability is equal to or larger than a reliability determination threshold (for example, 80%) is adopted for the control.

In FIG. 8B, when the reliability of the setting in the detection mode A is smaller than the reliability determination threshold and the reliability of the setting in the detection mode B is equal to or larger than the reliability determination threshold, the detection mode B is adopted. When the reliability is smaller than the reliability determination threshold in both detection modes A and B, the setting β in which the detection modes B and C are combined is used. When the reliability is equal to or larger than the reliability determination threshold in both detection modes A and B, the detection mode in which the reliability is the highest may be adopted or the detection mode A of the setting in which the detection frame is small may be adopted.

There is a possibility of a vector detected in frame, in which the combination setting of the detection modes is changed, being erroneously detected. When the erroneously detected vector is used for control, an excessive correction tendency for object blur correction is controlled. Therefore, an object angular velocity is assumed to be 0 deg/sec. The optical correction system in a direction in which the panning is performed by setting the object angular velocity to 0 deg/sec is maintained at an optical central position. Therefore, it is possible to prevent erroneous error of the object blur correction.

After the object vector is determined, a process of calculating an object angular velocity is performed. An angular velocity [deg/sec] can be calculated from an image surface movement amount [pix] through a calculation process reverse to a process of calculating the image surface movement amount [pix] from an angular velocity [deg/sec] using a focal distance, a frame rate, and a pixel pitch of an image sensor. The camera control unit 143 transmits, to the lens control unit 112, a value obtained by adding angular velocity data by the angular velocity output unit 222 in the interchangeable lens 100 to an angular velocity of the object calculated by the object angular velocity calculation unit 162. The information transmitted by the camera control unit 143 is received by the lens control unit 112 in the interchangeable lens 100 via the mount contact units 144 and 115.

Next, the second assist function of the panning assist will be described. The second assist function is a function of automatically setting a shutter speed in the camera.

The shutter speed calculation unit 163 in the camera body 131 calculates a shutter speed for the panning assist. Specifically, a shutter speed is calculated using the following information in accordance with Expression (1).

$$TV = \alpha/f/(\omega c - \omega s) \quad (1)$$

In the above expression, the following is defined:
TV: a shutter speed;
α: a set value of a flow effect of a background set by a photographer using the operation unit 142;
f: a focal distance of the interchangeable lens 100 obtained via the mount contact units 115 and 144;
ωc: an angular velocity detected by the angular velocity sensor 171 in the camera body 131; and
ωs: an object angular velocity calculated by the object angular velocity calculation unit 162.

The set value α of the flow effect of the background is a value that is set in advance so that a blur amount of a background image becomes, for example, 800 μm (micrometers) with a movement amount on an image. For the flow effect of the background, a plurality of effects such as small, intermediate, and large can be set step by step. Once the photographer sets the panning assist mode and sets the flow effect of the background to a desired setting, the camera body 131 automatically sets and controls a shutter speed. Accordingly, even an photographer inexperienced in the panning can simply set a shutter speed. The flow effect of the background may be set to numerical values such as 1 to 10 rather than the setting of small, intermediate, and large.

Figure 9:
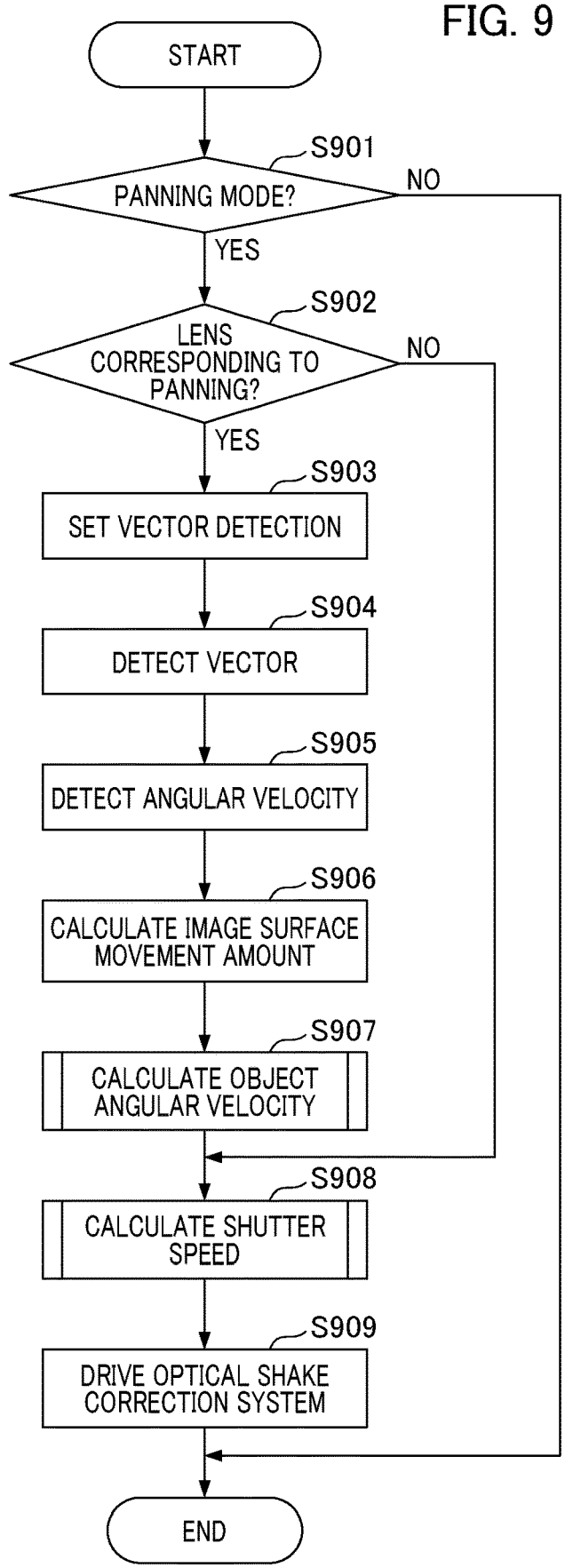
FIG. 9 is a flowchart illustrating overall panning assist.
Figure 10:
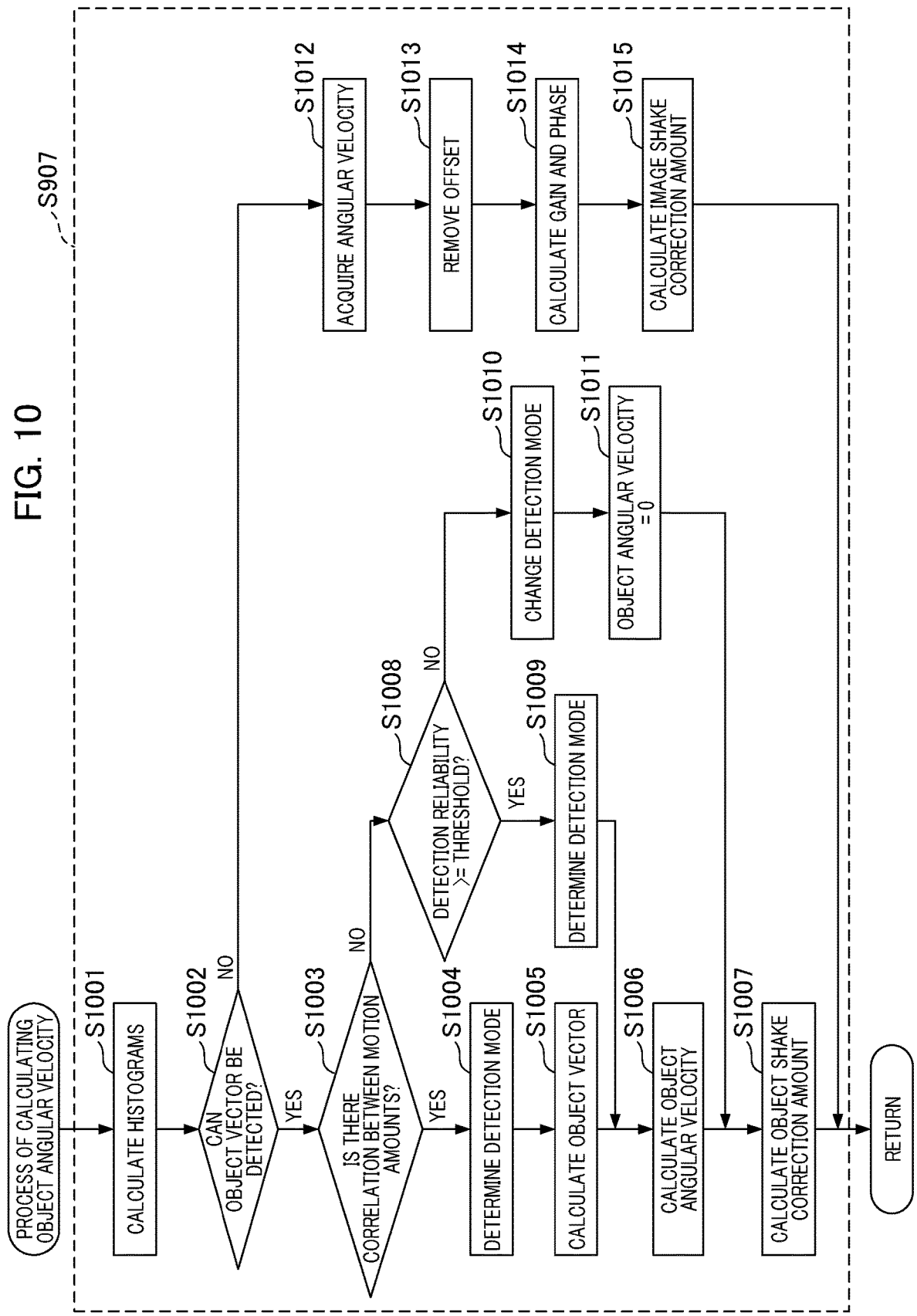
FIG. 10 is a flowchart illustrating a first assist function of the panning assist.

The control of the panning assist will be described with reference to the flowcharts of FIGS. 9 to 11. FIG. 9 is a flowchart illustrating a flow of an overall process related to the control of the panning assist. The following process is realized when each CPU of the camera control unit 143 and the lens control unit 112 interprets and executes a predetermined control program.

In S901, the camera control unit 143 determines whether an operation of setting the panning assist mode is performed the photographer using the operation unit 142. When the panning assist mode is set, the process proceeds to S902. When a mode other than the panning assist mode is set, the process ends without performing control of the panning assist.

In S902, the camera control unit 143 determines whether the interchangeable lens 100 mounted on the camera body 131 is an interchangeable lens corresponding to the panning assist. When it is determined that the interchangeable lens 100 is the interchangeable lens corresponding to the panning assist, the process proceeds to S903. Conversely, when it is determined that the interchangeable lens 100 is not the interchangeable lens corresponding to the panning assist, the process proceeds to S908. The process of determining whether the interchangeable lens 100 corresponds to the panning assist is performed based on a signal of lens information transmitted from the lens control unit 112 to the camera control unit 143.

In S903, the motion vector detection unit 151 sets the detection frame 302 of the vector based on the setting of the vector detection and the process proceeds to S904.

In S904, the motion vector detection unit 151 detects an in-plane motion in a plurality of detection frames with the motion vector and the process proceeds to S905.

In the embodiment, for example, when the setting α is set, the motion vector detection unit 151 sets a detection frame corresponding to the detection mode A and a setting frame corresponding to the detection mode B in S903. Then, in S904, the motion vector detection unit 151 detects the in-plane motion vector based on each of the detection frame corresponding to the detection mode A and the setting frame corresponding to the detection mode B.

In S905, the angular velocity detection signal detected by the angular velocity sensor 111 is transmitted from the lens control unit 112 to the camera control unit 143. The camera control unit 143 acquires the angular velocity detection signal of the blur and the process subsequently proceeds to S906.

In S906, the camera control unit 143 performs an arithmetic operation of converting the angular velocity acquired in S905 into an image surface movement amount. A movement amount (image surface movement amount) on the image surface is calculated using each angular velocity detected by the angular velocity sensor 111 in the interchangeable lens 100, a focal distance of the imaging optical system, and a frame rate. Subsequently, the process proceeds to S907.

In S907, the object angular velocity calculation unit 162 calculates an angular velocity of a main object from the main object vector determined from the vector detected in S904. The details of the calculation process will be described later with reference to FIG. 10. Subsequently, the process proceeds to S908.

In S908, the shutter speed calculation unit 163 calculates a shutter speed for the panning assist. The details of the calculation process will be described later with reference to FIG. 11. Subsequently, the process proceeds to S909.

In S909, the lens control unit 112 receives each piece of data of the object angular velocity calculated in S907 and the shutter speed for the panning assist calculated in S908 from the camera control unit 143 and determines a control amount for driving the shift lens group 104 during an exposure period. The driver 113 drives the shift lens group 104 according to the determined control amount. As a result that a difference between an angular velocity of the panning operation of the camera and an angular velocity of the main object is reduced by the optical image blur correction system, it is possible to improve a success probability of the panning. Thereafter, the process of FIG. 9 ends.

The process of calculating the object angular velocity illustrated in S907 of FIG. 9 and the process of calculating the image blur correction amount will be described with reference to the flowchart of FIG. 10.

In S1001, the camera control unit 143 performs a histogram arithmetic operation with the vector detected in S904 of FIG. 9. After the histograms (see FIGS. 8A and 8B) are generated, the process subsequently proceeds to S1002.

In S1002, the camera control unit 143 determines whether the object vector is detected in each detection mode based on the detection result of the motion vector detection unit 151. When it is determined that the object vector is detected, the process proceeds to S1003. Conversely, when it is determined that the object vector is not detected, the process proceeds to S1012 and the control is switched to the image blur correction control rather than the object blur correction control.

In S1003, the motion vector detection unit 151 determines the correlation between the motion amount of the detection modes set in S903 based on the histograms generated in S1001. When it is determined that there is the correlation between the motion amounts, the process proceeds to S1005. Conversely, when it is determined that there is no correlation between the motion amounts, the process proceeds to S1008.

In S1004, the motion vector detection unit 151 determines the detection mode to be used for the panning control. In the embodiment, the detection mode in which the detection frame setting is small is adopted. The process subsequently proceeds to S1005.

In S1005, the camera control unit 143 and the camera signal processing circuit 135 performs an object vector calculation process. Specifically, a process of retrieving the detection blocks in the concentric circular shape using the detection block closest to the position of the focus frame 303 exemplified in FIG. 3 as the origin is performed and a process of integrating a constant number of object vectors is performed. In this calculation process, the object vector is calculated based on the vector detection in accordance with the detection frame of the detection mode determined in S1004 or S1009. The process subsequently proceeds to S1006.

In S1006, the object angular velocity calculation unit 162 calculates the angular velocity of the main object. That is, the process of calculating the object angular velocity from the image surface movement amount of the main object is performed according to a method reverse to the method of calculating the image surface movement amount from the angular velocity in S906 of FIG. 9. The process subsequently proceeds to S1007.

In S1007, the camera control unit 143 adds the value of the angular velocity transmitted from the angular velocity output unit 222 to the camera control unit 143 to the object angular velocity calculated in S1006 and transmits the value to the lens control unit 112. The object angular velocity acquisition unit 223 acquires the object angular velocity transmitted from the camera control unit 143 to the lens control unit 112 and outputs the object angular velocity to the subtractor 224. The subtractor 224 calculates a difference between the object angular velocity and the angular velocity of the angular velocity sensor 111 in the interchangeable lens 100. The integrator 225 integrates the calculated difference and outputs the integrated value as a target control value (an object blur correction amount) of the blur correction control of the object to the control determination unit 204. The process subsequently proceeds to a return process.

In S1008, the motion vector detection unit 151 calculates whole detection reliability in each detection mode and determines whether the value of the whole detection reliability is equal to or larger than the reliability determination threshold (for example, 80%). The whole detection reliability is a ratio of a vector with high detection reliability of each detection block to the total detection number. When it is determined that the whole detection reliability is equal to or larger than the reliability determination threshold, the process proceeds to S1009. Conversely, when it is determined that the whole detection reliability is not equal to or larger than the reliability determination threshold, the process proceeds to S1010.

In S1009, the motion vector detection unit 151 determines the detection mode to be used for the panning control. In the embodiment, the detection mode in which the calculated detection reliability is high is adopted in S1008 and the vector detected in the detection setting mode is used to calculate the object vector in subsequent S1005.

In S1010, the motion vector detection unit 151 changes the detection setting. For example, the original setting α is changed to the setting β. The process subsequently proceeds to S1011.

In S1011, the object angular velocity calculation unit 162 sets the object angular velocity to 0 deg/sec since the correlation between the motion amounts and the detection reliability are low in the vector detected in the detection mode in accordance with the current setting combination. This is because it is possible to prevent the object blur from tending to be excessively corrected when the object angular velocity is calculated using an erroneously detected vector. The process subsequently proceeds to S1006.

When it is determined in S1002 that the object vector is not detectable, the control of the optical correction system is switched to the image blur correction control and the image blur correction control unit 121 performs the control. In S1012, the image blur correction control unit 121 of the lens control unit 112 acquires the angular velocity detected by the angular velocity sensor 111 in the interchangeable lens 100 and the process subsequently proceeds to S1013.

In S1013, the offset removal unit 201 of the image blur correction control unit 121 removes an offset component superimposed in the angular velocity acquired in S1012. For example, there is a method of using the highpass filter (HPF) that has a function capable of changing characteristics at any frequency bandwidth. In this method, the offset component superimposed in the angular velocity is removed by cutting off a low-frequency component included in the angular velocity with the highpass filter and then outputting a signal at a high-frequency bandwidth.

In S1014, the gain phase calculation unit 202 of the image blur correction control unit 121 calculates a gain and a phase when filter processing is applied to the angular velocity from which the offset component is removed in S1013. After a filter circuit including a phase compensation filter and an amplifier that performs amplification at a predetermined gain performs signal processing on the angular velocity detection signal, the process subsequently proceeds to S1015.

In S1015, the integrator 203 of the image blur correction control unit 121 integrates the angular velocity subjected to the signal processing by the filter circuit in S1014. An angle value obtained through the integration is output as a target control value (an image blur correction amount) of the image blur correction control to the control determination unit 204. Thereafter, a return process is performed.

Next, the calculation of the shutter speed for panning illustrated in S908 of FIG. 9 will be described with reference to the flowchart of FIG. 11.

In S1101, the camera control unit 143 acquires a set value (α) of a background flow effect operated by the photographer using the operation unit 142 and the process subsequently proceeds to S1102.

In S1102, the camera control unit 143 acquires information regarding the focus distance transmitted from the lens control unit 112 via the mount contact units 115 and 144 and the process subsequently proceeds to S1103.

In S1103, the camera control unit 143 acquires the angular velocity (ωc) detected by the angular velocity sensor 171 in the camera body 131, and then the process subsequently proceeds to S1104.

In S1104, the camera control unit 143 acquires the object angular velocity (ωs) calculated in S1006 of FIG. 10 and the process subsequently proceeds to S1105.

In S1105, the shutter speed calculation unit 163 calculates the shutter speed (TV) for panning based on Expression (1) using each piece of data acquired in S1101 to S1104. When it is determined that a lens not corresponding to the panning assist in S902 of FIG. 9 is mounted on the camera body 131, the angular velocity detected by the angular velocity sensor 111 is not acquirable. In this case, the angular velocity of the background is calculated with the background vector determined from the histograms in S1001 of FIG. 10 and the shutter speed for panning is calculated. Alternatively, the shutter speed may be set in accordance with a value (for example, 1/60 seconds) programmed in advance by the shutter speed calculation unit 163. Alternatively, for the setting of the shutter speed in the second assist function, automatic setting and manual setting may be able to be selected by a user using the operation unit 142. That is, a photographer accustomed to the panning can manually set any shutter speed. A photographer inexperienced in the panning can select the automatic setting.

As described above, in the embodiment, the detection of the object vector can be performed with high precision by setting the detection frame of a plurality of vectors. A clear panning photo in which a background image flows and an image blur of a main object is reduced can be simply taken through the first and second assist functions related to the panning assist.

Although the preferred embodiments of the present invention have been described using the imaging apparatus 1, a so-called mirrorless camera, with the configuration of FIG. 1, but the present invention is also broadly applicable to a single-lens reflex camera or a compact digital camera. In the foregoing embodiment, the example in which the motion vector detection unit 151 has the three types of detection modes of the vector detection, the detection modes A to C, has been described. However, a plurality of vector detection units performing processes corresponding to different modes may be included. The motion vector detection unit 151 has performed the vector detection on the same video information in the different detection modes. However, for video information considered to be imaged at substantially the same temporal period of time, a plurality of pieces of video information may be subjected to the vector detection in different detection modes. The video information considered to be imaged at substantially the same temporal period of time is, for example, video information imaged at substantially the same period of time by a plurality of image sensors, video information imaged at substantially the same period of time using different regions in the same image sensor and separately output, or video information imaged consecutively by the same image sensor.

(Other Embodiments)

The present invention can also be realized in a process of supplying a program for realizing one or more of the functions of the above-described embodiment to a system or an apparatus via a network or a storage medium and causing one or more processors in a computer of the system or the apparatus to read and execute the program. The present invention can also be realized by a circuit (for example, an ASIC) realizing one or more functions.

The preferred embodiments of the present invention have been described above, but the present invention is not limited to the embodiments and various modifications and changes can be made within the scope of the gist of the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-063597 filed on Mar. 28, 2017, which are hereby incorporated by reference herein in its entirety.

What is claimed is:

1. An image blur correction device that corrects blur of an object image by using an image blur correction unit, the object image being imaged by an imaging unit through an imaging optical system, the image blur correction device comprising:
   a memory; and
   at least one processor operating in accordance with a program stored in the memory,
   wherein the at least one processor comprises:
      a detection unit configured to detect motion amounts of images on the basis of imaged images;
      a calculation unit configured to calculate a motion amount of an object on the basis of the motion amounts of the images detected by the detection unit and a detection signal of blur detected by a blur detection sensor; and
      a control unit configured to control the image blur correction unit on the basis of the motion amount of the object calculated by the calculation unit, and
   wherein the detection unit detects the motion amounts of the images on the basis of multiple settings with different resolutions to detect the motion amounts, determines a correlation between the motion amounts of the images detected on the basis of the settings, and determines a setting to be used to detect the motion amounts of the images on the basis of the correlation.

2. The image blur correction device according to claim 1, wherein the detection unit generates at least one histogram of the motion amounts of the images detected on the basis of the settings, calculates a difference between the motion amounts of the images detected by the settings on the basis of the at least one histogram, and determines that the correlation occurs when the difference is equal to or smaller than a first threshold.

3. The image blur correction device according to claim 2, wherein the detection unit determines setting with fine resolution for detecting the motion amounts of the images is small as the setting to be used to detect the motion amounts of the images among the settings, when the detection unit determines that the correlation occurs.

4. The image blur correction device according to claim 1, wherein the detection unit further outputs reliability of a detection and the motion amounts of the images as a detection value, and
the detection unit determines the setting to be used to detect the motion amounts of the images on the basis of the reliability, when the detection unit determines that the correlation does not occur.

5. The image blur correction device according to claim 4, wherein the detection unit determines whether a number of the motion amounts with high reliability is equal to or larger than a second threshold,
the detection unit determines setting regarding the high reliability as the setting to be used to detect the motion amounts of the images among the settings when the number is equal to or larger than the second threshold, and
the detection unit determines setting different from the settings regarding the high reliability as the setting to be used to detect the motion amounts of the images when the number is smaller than the second threshold.

6. The image blur correction device according to claim 5, wherein the control unit controls the image blur correction unit by using an angular velocity of the object as 0, when the number is smaller than the second threshold.

7. The image blur correction device according to claim 1, wherein the settings are based on detection frames for detecting the motion amounts of the images, sizes of the detection frames are different from each other.

8. The image blur correction device according to claim 1, wherein the calculation unit calculates the motion amount of the object by setting a position closest to a focus detection frame as an origin among the motion amounts of the images detected by the detection unit, and by integrating a fixed number to the motion amounts of the images.

9. The image blur correction device according to claim 1, further comprising:
a setting unit configured to set a mode for supporting panning,
wherein, when the mode is set, the control unit calculates angular velocity data of the object with respect to the image blur correction device, calculates a correction amount for correcting the blur of the object image, and controls the image blur correction unit, and
when the mode is not set, the control unit controls the image blur correction unit by a correction amount of the image blur calculated from the detection signal.

10. An imaging apparatus comprising:
an image blur correction device;
an imaging unit; and
an image blur correction unit,
wherein the image blur correction device corrects blur of an object image by using the image blur correction unit, and the object image is imaged by the imaging unit through an imaging optical system,
wherein the image blur correction device comprises:
   a memory; and
   at least one processor operating in accordance with a program stored in the memory,
   wherein the at least one processor comprises:
      a detection unit configured to detect motion amounts of images on the basis of imaged images;
      a calculation unit configured to calculate a motion amount of an object on the basis of the motion amounts of the images detected by the detection unit and a detection signal of blur detected by a blur detection sensor; and
      a control unit configured to control the image blur correction unit on the basis of the motion amount of the object calculated by the calculation unit,
   wherein the detection unit detects the motion amounts of the images on the basis of multiple settings with different resolutions to detect the motion amounts, determines a correlation between the motion amounts of the images detected on the basis of the settings, and determines a setting to be used to detect the motion amounts of the images on the basis of the correlation, and wherein the image blur correction unit includes a correction lens that corrects the blur of the object image by changing an imaged position of light from the object.

11. The imaging apparatus according to claim 10, further comprising:
    a blur detection unit configured to detect blur of the imaging apparatus;
    a setting unit configured to set a mode in which panning is supported; and
    a control unit configured to calculate a shutter speed for panning from a detection signal by the blur detection unit and an angular velocity of the object, and perform shutter control when the mode is set.

12. A control method of an imaging blur correction device that corrects blur of an object image by using an image blur correction unit, the object image being imaged by an imaging unit through an imaging optical system, the control method comprising:
    detecting motion amounts of images on the basis of imaged images;
    calculating a motion amount of an object on the basis of the motion amounts of the images detected by a detection unit and a detection signal of blur detected by a blur detection sensor; and
    controlling the image blur correction unit on the basis of the motion amount of the object calculated by a calculation unit,
    wherein the detecting includes:
        detecting the motion amounts of the images on the basis of multiple settings with different resolutions to detect the motion amounts,
        determining a correlation between the motion amounts of the images detected on the basis of the settings, and
        determining a setting to be used to detect the motion amounts of the images on the basis of the correlation.

13. A non-transitory storage medium on which is stored a computer program for making a computer execute a control method of an image blur correction device, the image blur correction device that corrects blur of an object image by using an image blur correction unit, the object image being imaged by an imaging unit through an imaging optical system, the control method comprising:
    detecting motion amounts of images on the basis of imaged images;
    calculating a motion amount of an object on the basis of the motion amounts of the images detected by a detection unit and a detection signal of blur detected by a blur detection sensor; and
    controlling the image blur correction unit on the basis of the motion amount of the object calculated by a calculation unit,
    wherein the detecting includes:
        detecting the motion amounts of the images on the basis of multiple settings with different resolutions to detect the motion amounts,
        determining a correlation between the motion amounts of the images detected on the basis of the settings, and
        determining a setting to be used to detect the motion amounts of the images on the basis of the correlation.

* * * * *